May 12, 1970  I. G. DETRA  3,511,116
SELF-SHIFTING TRANSMISSION

Filed Aug. 27, 1968  4 Sheets-Sheet 1

FIG. 1

INVENTOR.
IRVIN G. DETRA
BY
Brumbaugh, Free, Graves & Donohue
his ATTORNEYS

INVENTOR.
IRVIN G. DETRA
BY
Brumbaugh, Free, Graves & Donohue
his ATTORNEYS

May 12, 1970      I. G. DETRA      3,511,116

SELF-SHIFTING TRANSMISSION

Filed Aug. 27, 1968      4 Sheets-Sheet 3

INVENTOR.
IRVIN G. DETRA
BY
Brumbaugh, Free, Graves & Donohue
his ATTORNEYS

May 12, 1970  I. G. DETRA  3,511,116
SELF-SHIFTING TRANSMISSION
Filed Aug. 27, 1968  4 Sheets-Sheet 4

FIG. 7

INVENTOR.
IRVIN G. DETRA

United States Patent Office 3,511,116
Patented May 12, 1970

3,511,116
SELF-SHIFTING TRANSMISSION
Irvin G. Detra, Mertztown, Pa., assignor to Mack Trucks, Inc., Allentown, Pa., a corporation of New York
Filed Aug. 27, 1968, Ser. No. 755,558
Int. Cl. B60k 21/00; F16h 5/56; F16d 21/04
U.S. Cl. 74—866
6 Claims

ABSTRACT OF THE DISCLOSURE

A self-shifting transmission has a rotatable input shaft and a rotatable output shaft. The output shaft is formed with axial threads, keys, or splines and, along a portion thereof, with helical threads or grooves cut into the axial splines. The input shaft drives a high-ratio gear and a low-ratio gear. A shift member rotatable with the output shaft is formed with helical threads engaging the helical grooves of the output shaft, so that torque therebetween tends to shift the shift member helically along the output shaft. Drive lock teeth and coast lock teeth are formed on the shift member. A drive lock is engageable with the drive lock teeth, and a coast lock is engageable with the coast lock teeth. The drive and coast locks are movable axially along the output shaft for engagement with and disengagement from the shift member. When engaged with the shift member, they transmit, respectively, drive torque from the shift member to the output shaft and coast torque from the output shaft to the shift member. The transmission is shifted under conditions established by electropneumatic apparatus under the control of an operator.

BACKGROUND OF THE INVENTION

This invention relates to transmissions and, more particularly, to a novel and highly-effective self-shifting transmission particularly adapted for use on large trucks and the like.

The transmission of an automotive vehicle such as a truck transmits power from the engine to the load with a mechanical advantage that is variable. When accelerating from a low speed and particularly from a standstill, when climbing a steep hill, particularly at low speed, and when pulling a heavy load, it is desirable and sometimes necessary to use a gear that is relatively low. As speed increases and acceleration, load and grade decrease, it becomes possible and, for reasons of economy, desirable to use gears that are progressively higher.

Vehicles intended for heavy service, such as large trucks and the like, are sometimes provided with two transmissions in series. The main transmission may typically have six gears that can be shifted by a mainbox lever under the control of a driver or operator to provide six different ratios between engine speed and vehicle speed. The second transmission is in series with the main transmission and typically has only two speeds. If the speeds of the transmissions are properly selected to avoid duplication, this provides a total of twelve different speeds. In effect, each of the speeds obtainable by operation of the mainbox lever is multiplied by a factor equal to the number of speeds obtainable by means of the secondary transmission.

Conventional mechanical secondary transmissions for large trucks and the like are not typically self-shifting: that is, it is necessary for the operator to effect the shift manually. While power-shifted transmissions exist, their performance is generally regarded as inefficient. Moreover, in the operation of conventional mechanical secondary transmissions, it is necessary to disengage and reengage the transmission clutch one or more times. Further, conventional transmissions typically consist of a large number of parts and are expensive to manufacture and repair. In addition, their construction tends to be heavy and bulky.

SUMMARY OF THE INVENTION

An object of the present invention is to remedy the shortcomings of conventional transmissions outlined above. In particular, an object of the invention is to provide a transmission that is self-shifting in response to operation of control means by an operator or driver. A further object of the invention is to provide a transmission that can be operated independently of the disengagement of the transmission clutch. A further object of the invention is to provide a transmission particularly suitable for use as an auxiliary or secondary transmission on heavy-duty vehicles such as trucks. Another object of the invention is to provide a transmission that is efficient, compact, and inexpensive to manufacture and repair yet extremely rugged and adapted to give long life under severe operating conditions.

The foregoing and other objects of the invention are attained, in a representative embodiment thereof, by the provision of a rotatable input shaft, a rotatable output shaft formed with axial keys, threads, or splines and, along a portion thereof, with helical threads or grooves cut into the axial splines, and a high-ratio gear and a low ratio gear driven by the input shaft. A shift member rotatable with the output shaft and formed with helical threads engaging the helical grooves of the output shaft is provided, so that torque therebetween tends to shift the shift member helically along the output shaft. Drive-lock teeth and coast-lock teeth are formed on the shift member. A drive lock is engageable with the drive lock teeth, and a coast lock is engageable with the coast-lock teeth. The drive and coast locks are formed with axial keys, threads, or splines permitting axial movement of the drive and coast locks along the output shaft for engagement with and disengagement from the shift member and preventing rotation of the drive and coast locks with respect to the output shaft. When engaged with the shift member, the drive and coast locks transmit, respectively, drive torque from the shift member to the output shaft and coast torque from the output shaft to the shift member. They also lock the shift member in a selected axial position on the output shaft, so that the shift member engages a selected drive gear.

A pair of oppositely-oriented pawls are mounted on the shift member to permit overrunning of the shift member by the high-ratio gear in one direction only and overrunning of the shift member by the low-ratio gear in the other direction only so that, when the shift member is in the neutral position, the rotational speed of the shift member cannot be greater than the rotational speed of the high-ratio gear nor less than the rotational speed of the low-ratio gear.

Motive means is provided for disengaging one of the locks from the shift member when the shift member is in a given gear position, thereby permitting the shift member to become disengaged from the other of the locks, and positioning the first-named lock to permit the shift member to move to a different gear position. Biasing means responsive to such movement of the shift member is provided for moving the other lock to re-establish engagement between the shift member and the other lock at the new position of the shift member.

The motive means includes a piston-cylinder assembly, together with a source of fluid under pressure for powering the piston-cylinder assembly. Solenoid means is provided for controlling communication between the piston-cylinder assembly and the source of fluid, and electric-circuit means is provided for actuating the solenoid means.

BRIEF DESCRIPTION OF THE DRAWING

An understanding of additional aspects of the invention may be gained from a consideration of the following detailed description of a representative embodiment thereof, taken in conjunction with the accompanying figures of the drawing, in which.

DESCRIPTION OF THE PREFERRED EMBODIMENTS

Figure 1:
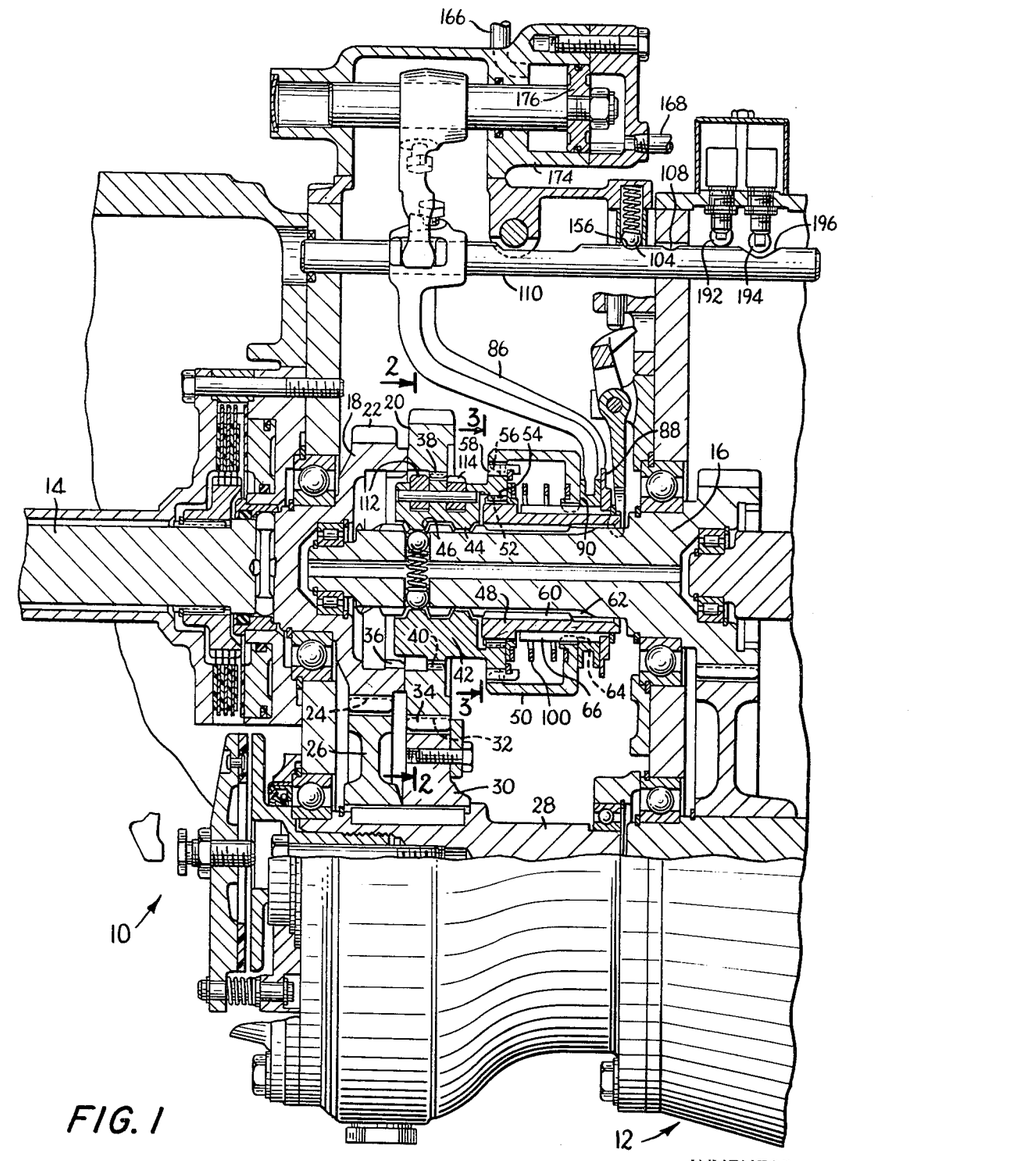
FIG. 1 is an axial view, partly in section, of a representative transmission in accordance with the invention.

FIG. 1 shows a transmission 10 constructed in accordance with the invention. The transmission 10 may be used wherever it is desired to transmit mechanical energy from a power sourse to a load with variable mechanical advantage. The transmission is particularly adapted to be mounted in series with the main transmission 12 of a large truck or similar heavy-duty-vehicle.

In the illustrated embodiment, a rotatable input shaft 14 drives a rotatable output shaft 16 at a relatively high speed or a relatively low speed, depending upon which of gears 18 and 20 (which are driven at different speeds by the input shaft 14) is engaged with the output shaft 16.

The gear 18 is a high-ratio, direct-drive gear, while the gear 20 is a low-ratio, reduction gear. The gear 18 is fomed with teeth 22 which engage teeth 24 of a reduction gear 26 mounted fast on a countershaft 28. Two or more countershafts are provided to split the load and reduce tooth loads. This permits a reduction in gear face width and a shortened overall length. In addition, it provides radial support for the gear 20 and a central tunnel within which shift member 42 operates. The reduction gear 26 is of somewhat greater diameter than the high-ratio gear 18. Another reduction gear 30 is also mounted fast on the countershaft 28. The diameter of the reduction gear 30 is less than the diameter of the reduction gear 26.

The reduction gear 30 is formed with teeth 32 which engage teeth 34 of the low-ratio gear 20. The low-ratio gear 20 has a diameter greater than that of the gear 30.

When the high-ratio gear 18 is driven by the input shaft 14, it turns with angular and tangential velocities which depend on the speed with which the input shaft 14 turns; the reduction gear 26, being peripherally engaged with high-ratio gear 18 and having a somewhat greater diameter than the high-ratio gear 18, turns with a tangential velocity equal to that of the high-ratio gear 18 and an angular velocity somewhat less than that of the high-ratio gear 18; the reduction gear 30 turns with an angular velocity equal to that of the reduction gear 26 and a tangential velocity less than that of the reduction gear 26; and the low-ratio gear, being peripherally engaged with the reduction gear 30 and having a somewhat greater diameter than the reduction gear 30, turns with a tangential velocity equal to that of the reduction gear 30 and an angular velocity somewhat less than that of the reduction gear 30. Accordingly, the gears 18 and 20, which are coaxial, turn (in the same direction) at different angular velocities, the angular velocity of the high-ratio gear 18 being greater than that of the low-ratio gear 20.

The gears 18 and 20 are formed with clutch teeth 36 and 38 respectively. The clutch teeth 36 and 38 are disposed in circles of equal diameter, face inwardly with respect to the common axis of the gears, and rotate about the common axis at different speeds, the clutch teeth 36 moving at the greater rate.

Figures 2, 3, 6:
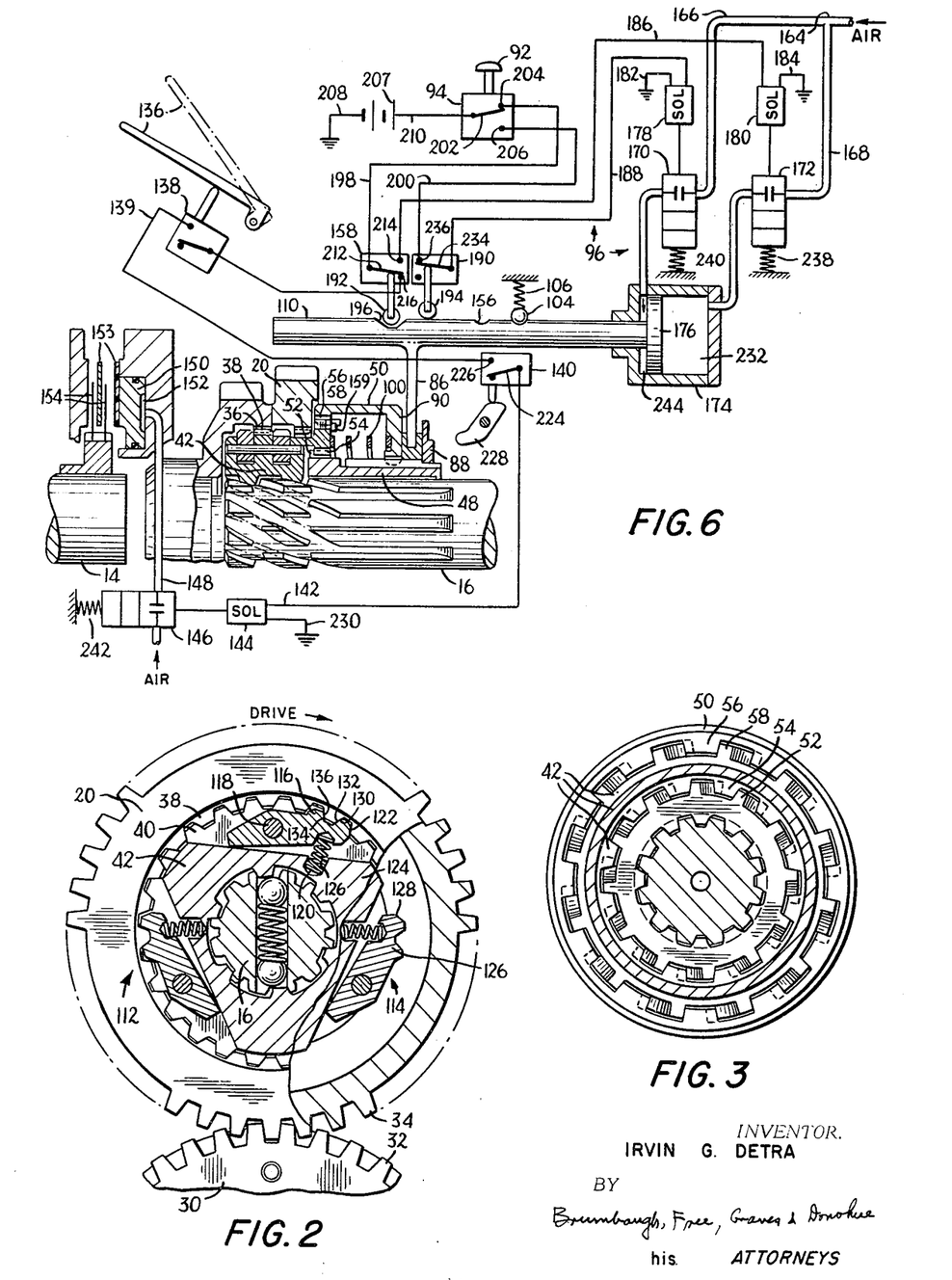
FIG. 2 is a view along the line 2—2 of FIG. 1, looking in the direction of the arrows.
FIG. 3 is a view along the lines 3—3 of FIG. 1, looking in the direction of the arrows.
FIG. 6 is a view similar to FIGS. 4 and 5, but showing the apparatus in a third condition.
Figures 4, 5:
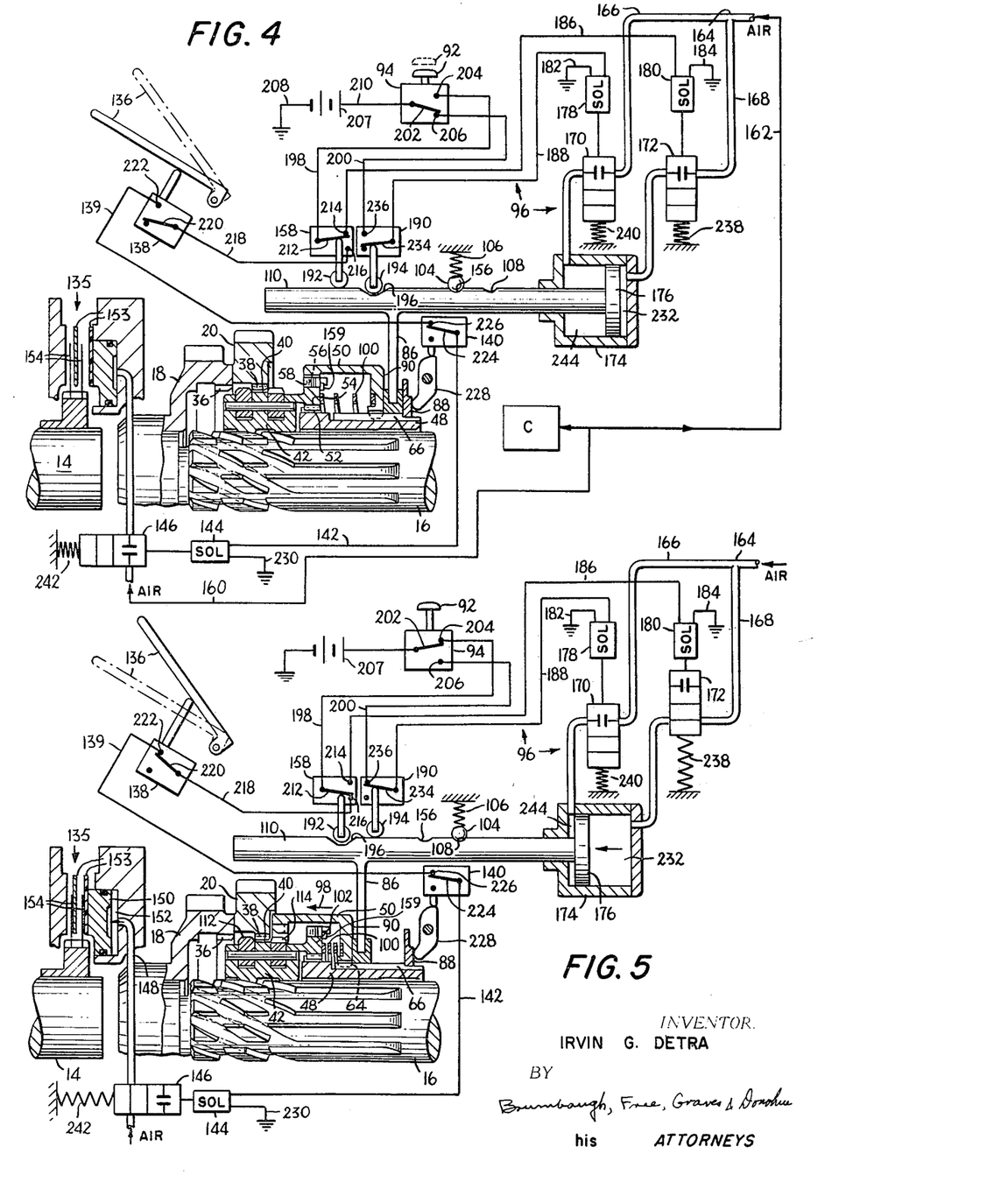
FIG. 4 is a schematic view of the transmission and electropneumatic control apparatus therefor according to the invention, the apparatus being shown in a first condition.
FIG. 5 is a view similar to FIG. 4 but showing the apparatus in a second condition.

Neutral position being disregarded for the moment, the transmission 10 is in low or high gear depending upon whether the clutch teeth 40 of a shift member 42 engage the slow-moving clutch teeth 38, as shown in FIGS. 1, 4, and 5, or the fast-moving clutch teeth 36, as shown in FIG. 6. In order to provide a ratio change from low to high, it is therefore necessary to displace the shift member 42 helically along the output shaft 16 to the left as seen in FIGS. 1, 4, 5 and 6.

To cause such shifting movement of the shift member 42, the shift member 42 is formed with helical threads 44 which engage helical threads or grooves 46 formed on a first or forward portion of the output shaft 16. Torque between the output shaft 16 and the shift member 42 tends to displace the shift member 42 helically along the output shaft 16: that is, to translate the shift member 42 along the axis of the output shaft 16 while simultaneously rotating the shift member 42 with respect to the output shaft 16.

Figure 7:
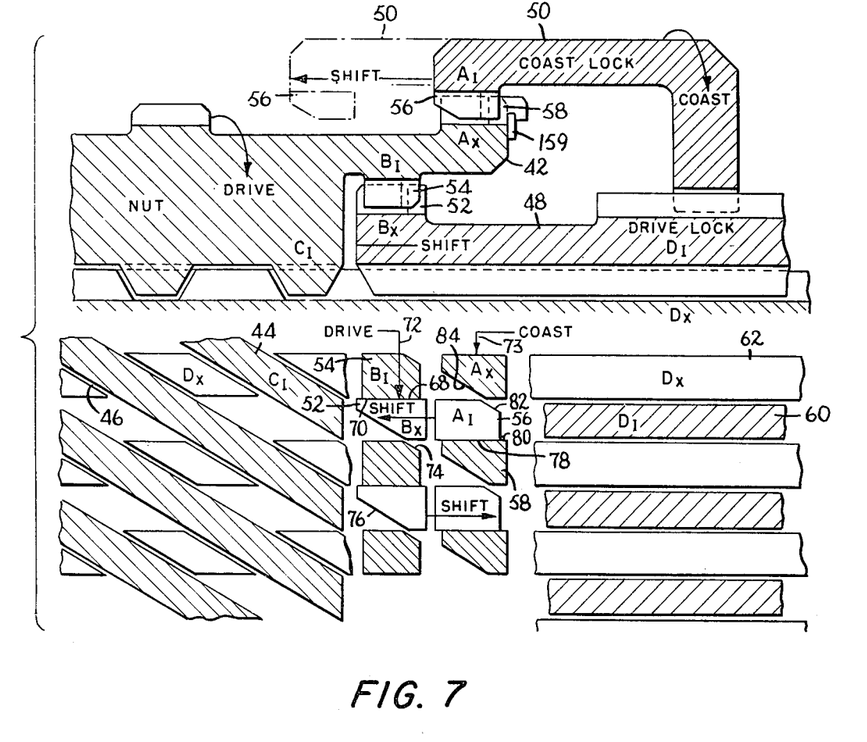
FIG. 7 is a developed plan view of a portion of the apparatus of the invention.

The direction of the displacement depends on the direction of the torque and the direction of winding of the threads 44 and grooves 46. If the input shaft 14 rotates clockwise as viewed from a position in front of the engine, the high-speed gear 18, low-speed gear 20, shift member 42, and output shaft 16 all rotate clockwise as viewed from a position at the left of FIGS. 1, 4, 5 and 6. Then, if the helical threads 44 and grooves 46 extend from lower right to upper left as seen in FIG. 7, drive torque between the shift member 42 and the output shaft 16 tends to move the shift member 42 to the right as seen in FIG. 1, and coast torque transmitted from the output shaft 16 to the shift member 42 by way of the helical grooves 46 and helical threads 44 tends to move the shift member 42 to the left as seen in FIG. 1.

Thus, the reaction between the engaging portions of the shift member 42 and the output shaft 16 serves to facilitate a ratio change, provided the shift member 42 is not prevented from shifting by means now to be described.

The shift member 42 can be held stably in the low- or high-gear position by a pair of movable locks 48 and 50. The lock 48 is a drive lock and, when engaged with the shift member 42, transmits drive torque from the shift member 42 to the output shaft 16. The lock teeth 52 and 54 formed on the drive lock 48 and shift member 42, respectively, are so formed (see FIG. 7, discussed in detail below) that coast torque is not transmitted by the drive lock 48 to the shift member 42.

The coast lock 50, when it is engaged with the shift member 42, transmits coast torque from the coast lock 50 to the shift member 42. The lock teeth 56 and 58 formed on the coast lock 50 and shift member 42, respectively, are so formed (see FIG. 7, discussed in detail below) that drive torque is not transmitted from the shift member 42 to the coast lock 50.

The drive lock 48 is formed with axial threads, grooves, or splines 60 that engage axial threads, keys or splines 62 formed on the output shaft 16 so that the drive lock can be moved axially of the output shaft 16 and is constrained to rotate with the output shaft 16 but cannot be rotated with respect to the output shaft 16.

The coast lock 50 is formed with axial threads, grooves, or splines 64 that engage axial threads, keys, or splines 66 formed on the outer circumference of the drive lock 48 so that the coast lock 50 likewise is movable axially of the output shaft 16 and constrained to rotate with the output shaft 16 but cannot be rotated with respect to the output shaft 16.

FIGS. 3 and 7 show in detail the structure of the lock teeth 52, 54, 56 and 58 by virtue of which opposed pairs of lock teeth transmit torque in one direction only.

In FIG. 7, the lock teeth 52, 54 are represented as offset axially in a forward direction with respect to the lock teeth 56, 58, in order to show simultaneously the structure of both sets of teeth. As FIGS. 1, 4, 5 and 6 show, the lock teeth are actually at the same axial coordinate in the preferred embodiment of the invention.

The drive lock teeth 52, 54 are formed with engaging surfaces 68, 70, respectively, which extend axially substantially in a plane containing the axis of the shift member 42 and drive lock 48. Accordingly, when the lock teeth 54 move in a direction indicated by the arrow 72 (the clockwise direction as viewed from a position to the left of FIGS. 1, 4, 5, and 6 or as viewed from the front of the transmission), the teeth 52 and hence the drive lock 48 and output shaft 16 are forced to rotate in the same (clockwise) direction. On the other hand, when the direction of movement of the teeth 54 is reversed (with respect to the teeth 52), beveled portions 74 of the teeth 54 are opposed to complementally bevelled portions 76 of the teeth 52. The inclination of these surfaces with respect to the axis of the drive lock 48 and shift member 42 is substantially the same as the inclination of the engaging surfaces of the segments DK and CI forming the helical grooves 46 and threads 44. Accordingly, the drive lock teeth 52 and 54 permit the shift member to rotate counterclockwise (as viewed from the left of FIGS. 1, 4, 5, and 6) with respect to the output shaft 16 and advance to the left (as seen in FIGS. 1, 4, 5, 6 and 7), unless such shifting movement of the shift member 42 is prevented by engagement of the coast lock teeth 56 and 58.

As FIG. 7 also shows, the coast lock teeth 56 and 58 are similar to the drive lock teeth 52 and 54, except that the locations of the axial and bevelled surfaces are relatively reversed. Specifically, in the case of the coast lock teeth 56 and 58, axial surfaces 78 and 80 are engageable so that, if the teeth 56 are driven by coast forces in the direction of arrow 73, the teeth 56 force the teeth 58 to move clockwise as seen from the left of FIGS. 1, 4, 5, and 6. On the other hand, drive torque is not transmitted from the shift member 42 to the coast lock 50, because beveled surfaces 82 and 84 formed on the teeth 56 and 58, respectively, permit the shift member 42 to move to the right (as seen in FIGS. 1, 4, 5, 6, and 7) in response to reaction between the shift member 42 and the output shaft 16, unless the drive lock teeth 52 and 54 are engaged.

In order to provide a ratio change, it is necessary to disengage one of the locks 48 and 50 from the shift member 42. For an upshift from low (which is the gear in which the transmission is shown engaged in FIG. 1) to high, the coast lock 50 is moved axially to the left by motive means described in detail hereinafter. This permits the shift member 42 to move by reaction to the left along a helical path, and, following the completion of such movement of the shift member 42, the drive lock is moved to the left automatically by a spring 100 the operation of which is described in detail below to lock the shift member 42 in the high-gear position. In a downshift, it is the drive lock 48 that is first advanced (to the right), whereupon the shift member 42 moves by reaction to the right along a helical path, and, finally, the coast lock 50 is moved automatically by the spring 100 to the right to lock the shift member 42 in the low-gear position shown in FIG. 1.

The shifting of the drive or coast lock 48 or 50 to initiate a shift of gears may be effected by manual actuation of a special lever. However, when the transmission 10 is used in conjunction with a manually-operated main transmission, it is more convenient to operate the transmission 10 by a selector switch control member 92 (the operation of which is described in detail hereinafter) on the mainbox shift lever.

The physical shifting of the drive or coast lock 48 or 50 to initiate an upshift or downshift is effected by an arm 86 (shown in detail in FIG. 1 and schematically in FIGS. 4, 5, and 6) engageable with a flange 88 on the drive lock 48 and a flange 90 on the coast lock 50.

FIGS. 4–6 illustrate successive steps in the shifting of the shift member 42 from the low-gear position to the high-gear position. Phantom lines in those figures show the helical path of travel of the shift member 42 in its shifting movement.

FIG. 4 shows the apparatus in the same position in which it is shown in FIG. 1: that is, the clutch teeth 38 and 40 are engaged with each other, the drive lock teeth 52 and 54 are engaged with each other, and the coast lock teeth 56 and 58 are engaged with each other. Thus, the low-ratio gear 20, the shift member 42, and the output shaft 16 turn as a unit. Inasmuch as the torque-transmitting faces 68, 70 and 78, 80 (FIG. 7) of the drive-lock teeth 52, 54 and coast lock teeth 56 and 58, respectively, lie in planes containing the axis of the low-ratio gear 20, shift member 42, and output shaft 16, the helical threads 44 and helical grooves 46 formed on the shift member 42 and output shaft 16, respectively, are ineffective to shift the shift member 42.

FIG. 5 shows the condition of the transmission at an intermediate point during the shift from low to high. In response to the pulling upwardly of a selector switch control member 92 to reverse the state of a selector switch 94, motive means comprising electropneumatic apparatus indicated generally by a reference numeral 96 advances the arm 86 to the left as seen in FIG. 5 and as shown by an arrow 98 so that the axial splines 64 formed on the coast lock 50 slide axially within the axial splines 66 formed on the drive lock 48 and the coast lock 50 is brought to the left-hand end of its permitted travel. It is positioned precisely there by biasing means such as a compression coil spring 100 bearing on the side of the flange 90 opposite that engaging the arm 86 and a flange 102 formed on the shift member 42. The spring 100 forces the coast lock 50 tightly against the arm 86, which is accurately positioned by detent means such as a ball 104 forced by biasing means such as a compression coil spring 106 into a groove 108 formed on a ram extension 110 with which the arm 86 is integral.

By slowing the input shaft 14, while the output shaft 16 continues to rotate at substantially constant speed because of inertia, a coast torque tends to develop between the output shaft 16 and shift member 42. Inasmuch, however, as the coast lock 50 has been disengaged from the shift member 42, the coast torque cannot be transmitted from the output shaft 16 through the coast lock 50 to the shift member 42. The torque tends to be transmitted from the output shaft 16 through the helical grooves 46 and threads 44 by which the output shaft 16 engages the shift member 42, but no appreciable torque can be transmitted through this route, in view of the helical formation of the splines and grooves 44, 46. Accordingly, the shift member 42 shifts axially to the left to a neutral position intermediate the positions shown in FIGS. 5 and 6, while rotating counterclockwise as seen from a position to the left of FIGS. 1, 4, 5, and 6 so that the clutch teeth 38 and 40 become disengaged.

At this neutral position, oppositely-directed synchronizing pawls 116 and 126 are simultaneously opposed to the clutch teeth 36 and 38, respectively.

FIG. 2 shows the synchronizing pawls in greater detail. A ratchet 112 includes one or more ratchet pawls 116 pivotable on studs 118 and urged in a counterclockwise direction (as seen in FIG. 2) by biasing means such as a compression coil spring 120 bearing at one end against an end 122 of the ratchet pawl 116 and at the other end against a generally triangular portion 124 of the shift member 42 within which a recess 126 is formed for receiving the spring 120.

A ratchet 114 is similar to the ratchet 112 except that its ratchet pawls 126 are mounted in the reverse direction: that is, it is the counterclockwise ends 128 (as seen in FIG. 2) rather than the clockwise ends of the ratchet pawls 126 that are biased outwardly with respect to the ratchet axis.

The ratchet 112 thus permits overrunning by the clutch teeth 36 when the clutch teeth 36 turn clockwise (from the perspective of FIG. 2) with respect to the ratchet 112, for in such case, a straight line between the pivot formed by the stud 118 and the engaging surfaces 130 and 132 of the clutch teeth 36 and ratchet pawl 116, respectively, forms an acute angle with those surfaces. On the other hand, the ratchet 112 does not permit rotation of the cltuch teeth 36 in a counterclockwise direction (from the perspective of FIG. 2) with respect to the ratchet 112, inasmuch as the engaging surfaces 134 and 136 of the clutch teeth 36 and ratchet pawls 116, respectively, are approximately at right angles to a line between the pivot formed by the stud 118 and those surfaces.

Similarly, the ratchet 114 permits overrunning thereof by the clutch teeth 38 in a counterclockwise direction (as seen in FIG. 2) but not in a clockwise direction.

When during an upshift the shift member 42 initially shifts to a position such that the pawls 116 and 126 are opposed to the clutch teeth 36 and 38, respectively, the pawls 116 and 126 have initially substantially the same rotational speed as the low-ratio gear 20, inasmuch as the clutch teeth 38 and 40 have just become disengaged. The high-ratio gear 18 always turns faster than the low-ratio gear 20 when the engine is running, and the high-ratio gear 18 thus initially overruns the ratchet pawls 116 in a clockwise direction (as seen in FIG. 2).

With the pawls 116 and 126 opposed to the clutch teeth 36 and 38, respectively, both pawls are overrun so long as the rotational speed thereof is intermediate the rotational speeds of the high-ratio gear 18 and the low-ratio gear 20. The transmission is then in neutral, and the reaction between the shift member 42 and the output shaft 16 through the helical threads and grooves 44 and 46 disappears until a further reaction occurs because of synchronization of the pawls 116 and 126 with the clutch teeth 36, the pawls 116 effecting such synchronization by their engagement with the teeth 36.

Such synchronization is hastened by application of a brake 135. To apply the brake, the operator removes his foot from an accelerator pedal 136, which automatically closes a switch 138. This completes a circuit through a line 139, a brake switch 140, and a line 142 to a solenoid 144 which opens a valve 146 to admit a fluid such as compressed air through a line 148 to move a piston 150 fitted snugly but slidably within a cylinder 152 to the left as seen in FIG. 5. Such motion of the piston 150 forces tightly together brake elements 153, which are connected to the housing so that they do not rotate, and brake elements 154, which are secured to and rotate with the input shaft 14. This braking of the input shaft 14 slows the high-ratio gear 18 and the low-ratio gear 20 until the ratchet 112 is synchronized with the clutch teeth 136.

Further slowing of the high-ratio gear 18 produces a reaction between the shift member 42 and the output shaft 16 by virtue of which the shift member 42 moves again helically to the left (as seen in FIG. 5) and counterclockwise with respect to the output shaft 16 (as seen in FIG. 2). The shift member 42 is brought in this fashion to the position shown in FIG. 6, in which the clutch teeth 36 formed on the high-ratio gear 18 engage the clutch teeth 40 formed on the shift member 42.

The drive and coast locks 48 and 50 have their lock teeth 52 and 56 so aligned with the lock teeth 54 and 58, respectively, that they engage the shift member 42 only at spaced full-torque-transmitting stations, where the clutch teeth 40 fully engage the clutch teeth 36 or 38. During the upshift, when the shift member 42 is accurately positioned as shown in FIG. 6, the alignment of the lock teeth 52 and 54 is such that the compression spring 100 then causes the drive lock 48 to follow up and snap into engagement with the shift member 42 and prevent it from backing off when load reversal occurs. Thus the shift member 42 is locked in its new torque-transmitting station (high gear) and will not move out of this station until the drive lock is intentionally disengaged to facilitate a downshift.

When the vehicle slows to the extent that the driver anticipates the need for a downshift to low gear, he pushes the selector switch control 92 to the position illustrated in FIG. 4. This brings the selector switch 94 to the position illustrated in FIG. 4 and actuates the electropneumatic apparatus 96 in a way described in detail hereinafter to urge the drive lock 48 from its position illustrated in FIG. 6 to that illustrated in FIG. 4. Specifically, the ram extension or shift rail 110 develops a force tending to move the arm 86, flange 88, and drive lock 48 to the right as seen in FIG. 4 until the ball 104 is forced by the spring 106 into a recess 156.

Movement of the drive lock 48 does not occur immediately, but only when the driver lifts his foot from the accelerator pedal 136 following the pushing of the selector switch control 92 to the position illustrated in FIG. 4. This is because, so long as torque is being transmitted through the clutch teeth 36 and 40 and the lock teeth 52 and 54, as shown in FIG. 6, the drive lock 48 cannot be readily disengaged from the shift member 42. When, however, the driver, having depressed the selector switch control 92, raises his foot from the accelerator pedal 136, a torque reversal occurs, so that the force with which the faces 68 and 70 (FIG. 7) of the lock teeth 52 and 54 (FIGS. 6 and 7) are pressed together is diminished, and the drive lock 48 is moved to its right-hand position by the arm 86. The coast lock 50 is prevented from following immediately to the right by a snap ring 159 secured to the shift member 42.

The brake 135 is not applied on the downshift, even though the driver's removal of his foot from the accelerator pedal 136 permits the switch 138 to close, because one of switches 140 and 158 is always open on the downshift as explained hereinafter. When the driver synchronizes engine and road speeds by depressing the accelerator pedal 136, the reaction between the shift member 42 and the output shaft 16 causes the shift member 42 to move rapidly from the position shown in FIG. 6 to that shown in FIG. 4. There is a hesitation in neutral, the shift being completed by reaction of the low gear teeth 38 on the low pawls 126 when synchronization occurs. When the shift member 42 is in the low position, the coast lock 50 is snapped into locking engagement therewith by the spring 100, thus locking the shift member 42 in the low position.

The electropneumatic apparatus 96 for facilitating control of the transmission is shown in detail in FIGS. 4–6. The apparatus 96 includes a source C of compressed air or another fluid such as hydraulic fluid under pressure. The source C may conveniently be an engine-driven compressor. Compressed air or another fluid is delivered through lines 160 and 162 (FIG. 4) to the brake valve 146 and a junction 164 connected to lines 166 and 168 supplying air to low and high valves 170 and 172, respectively.

The low and high valves 170 and 172 admit air to opposite ends of a cylinder 174 fitted snugly with a piston 176 slidable therein. The piston 176 is movable to the left and to the right by admitting air through the high valve 172 and the low valve 170, respectively. In this way, the shift rail 110 is moved to the left and to the right to cause engagement of the ball 104 with the recess 108 or the recess 156, respectively. The low and high valves 170 and 172 are controlled by low and high solenoids 178 and 180, respectively. The low and high solenoids 178 and 180 are connected to ground through leads 182 and 184, respectively. The high solenoid 180 is connected by a line 186 to the high switch 158, while the low solenoid 178 is connected by a line 188 to a low switch 190.

With the transmission in low gear as shown in FIG. 4, the high switch 158 is closed and the low switch 190 is open. The high and low switches 158 and 190 are actuated by cam followers 192 and 194, respectively. The cam followers 192 and 194 are biased to follow the contour of the upper surface (as seen in FIG. 4) of the shift rail 110. This surface is formed with a cam recess 196 within which a cam follower 194 is positioned when the transmission is in low (FIG. 4) and within which the cam follower 192 is positioned the transmission is in high (FIG. 6).

The high and low switches 158 and 190 are connected by leads 198 and 200, respectively, to the selector switch 94. The selector switch 94 has a movable arm 202 which engages a contact 204 or a contact 206, depending on whether the selector switch control 92 is up or down. A source of power such as the vehicle battery 207 is connected by a lead 208 to ground and by a lead 210 to the switch 94.

The high switch 158 includes a movable contact arm 212 which engages either a contact 214 or a contact 216, depending on whether cam follower 192 is in the position illustrated in FIG. 4 or in the position illustrated in FIGS. 5 and 6. The high switch 158 is connected by a lead 218 to the accelerator switch 138, which contains a movable contact arm 220 that engages or does not engage a contact 222, depending on whether the throttle is closed, as indicated by the position of the accelerator pedal 136 shown in FIG. 5, or open, as indicated by the position of the accelerator pedal 136 shown in FIGS. 4 and 6.

The brake switch 140, which is connected to the contact 222 through the line 139, includes a movable contact arm 224 which engages or does not engage a contact 226 depending on whether a brake switch actuator cam 228 is in the position shown in FIGS. 4 and 5 or the position shown in FIG. 6.

The brake switch actuator cam is biased to assume the position shown in FIG. 6 but is adapted to be pivoted to the position shown in FIGS. 4 and 5 by the flange 88 formed on the drive lock 48. When the drive lock 48 is in the position shown in FIG. 6, the cam 228 is no longer supported by the flange 88 and rotates clockwise (as seen in FIG. 6) to permit the movable contact arm 224 to separate from the contact 226, thereby stopping the flow of current through the line 142, the solenoid 144, and a line 230 connecting the solenoid 144 to ground.

The operation of the entire transmission apparatus, including the electropneumatic apparatus 96, is believed to be clear from the preceding description. In order to shift from low to high, the vehicle having accelerated to the point where the driver anticipates a need for an upshift, high is preselected by pulling up on the selector switch control 92. This completes a circuit from the ground through the battery 207, the line 210, the contact arm 202, the contact 204, the line 198, the movable arm 212 of the high switch 158, the contact 214, and the line 186 to the solenoid 180 and back to ground through a line 184. The solenoid 180 moves the valve 172 from the position indicated in FIG. 4 to that indicated in FIG. 5, the air is admitted through the line 168 to the side 232 of the piston 176 within the cylinder 174. The piston 176 moves from its position illustrated in FIG. 4 to that illustrated in FIG. 5, the ball 104 being forced by the spring 106 into the recess 108 in the shift rail 110 and maintaining the shift rail 110 in the position illustrated in FIG. 5. This occurs only after preselection is completed. The coast lock 50 is thus moved from the position illustrated in FIG. 4 to that illustrated in FIG. 5.

The shifting of the shift rail 110 reverses the states of the high and low switches 158 and 190. Specifically, the cam follower 194 rises to the upper edge of the shift rail 110 while the cam follower 192 drops into the cam recess 196. This moves the arm 212 of the high switch 158 from contact with the contact 214 (FIG. 4) to contact with the contact 216 (FIG. 5). Also, it moves the contact arm 234 of the low switch 190 from an open position (FIG. 4) to a closed position in which it makes contact with the contact 236 (FIG. 5).

The separation of the contact 212 from the contact 214 in the high switch 158 interrupts current to the high solenoid 180, thereby permitting the high valve 172 to be closed by biasing means such as a spring 238. In the state of the high switch 158 illustrated in FIG. 5, the high switch 158 also closes a circuit through the line 218 to the accelerator pedal switch 138.

The driver then completes a circuit through the accelerator pedal switch 138, through the brake switch 140 and the brake solenoid 144 by removing his foot from the accelerator pedal 136. The accelerator pedal 136 is conventionally biased by means (not shown) to close the throttle when the foot is removed from the pedal. Thus, the arm 220 makes contact with the contact 222, thereby completing a circuit through the line 139, the switch 140, the line 142, the solenoid 144 and a line 230 to ground. During this time, the brake switch 140 is maintained closed as previously noted by the brake switch cam 228, which is still in engagement with the flange 88 formed on the drive lock 48.

In this way, the brake 135 is set by air flowing through the valve 146 and into the cylinder 152 to move the piston 150 and brake elements 153 to the left (as seen in FIG. 5). The application of the brake synchronizes engine and road speeds, at which instant the drive lock moves to the left to lock the transmission in high gear as shown in FIG. 6.

With the transmission in high gear, the high selector switch 158 completes a circuit to the accelerator pedal switch 138 or the brake switch 140, depending on the throttle position. The brake switch 140 is always opened, however, while the drive lock 48 is in the high-gear position, thereby preventing undesired application of the shift brake 135, regardless of the position of the accelerator pedal 138. None of the solenoids 144, 178, and 180 is energized, and all of the valves 146, 170, and 172 are closed by biasing means such as springs 238, 240, and 242.

When the vehicle slows excessively to the extent that the driver anticipates the need for a downshift to low gear, he pushes the selector switch actuator 92 down to complete a circuit from ground through the lead 208, the battery 207, the lead 210, the arm 202, the contact 206, the lead 200, the contact 236, the arm 234, the lead 188, the solenoid 178, and the lead 182 back to ground. This pressurizes the side 244 of the piston 176 within the cylinder 174 so that, when the driver lifts his foot from the accelerator pedal 136 thereby achieving torque reversal, the drive lock moves to the low position (i.e., to the right as seen in FIGS. 1, 4, 5, and 6). This closes the brake switch 140, as shown in FIG. 4, but the switch 158 maintains the brake 135 in an inoperative condition.

The driver synchronizes engine and road speeds by depressing the accelerator pedal 136, and the shift to low gear is completed.

Thus there is provided in accordance with the invention a novel and highly effective transmission which is extremely compact and rugged and economical to manufacture and repair and which is self-shifting in response to manipulation of control means by an operator.

Many modifications in form and detail within the spirit and scope of the invention will readily occur to those skilled in the art. For example, the relative positions of the ball and recesses 104, 108, 156 on the one hand and the cam followers and cam recesses 192, 194, 196 on the other can be as shown in FIG. 1 or as shown in FIGS. 4, 5, and 6. Also, the shift rail 110 may be coaxial with the piston 176 (FIGS. 4, 5, and 6) or not (FIG. 1). Accordingly, the invention is to be construed as including all of the modifications thereof.

I claim:

1. A self-shifting transmission comprising a rotatable input shaft; a rotatable output shaft formed with axial and helical threads; a high-ratio gear and a low-ratio gear driven by said input shaft; a shift member rotatable with said output shaft and formed with helical threads engaging the helical threads of said output shaft, so that torque therebetween tends to shift said shift member helically along said output shaft; drive lock teeth and coast lock teeth formed on said shift member; a drive lock engageable with said drive-lock teeth; and a coast lock engageable with said coast-lock teeth, said drive and coast locks (a) being formed with axial threads permitting axial movement of said drive and coast locks along said output shaft for engagement with and disengagement from said shift member and preventing rotation of said drive and coast locks with respect to the axial threads of said output shaft and (b), when engaged with said shift member, transmitting, respectively, drive torque from said shift member to said output shaft and coast torque from said output shaft to said shift member, said shift member being movable in response to torque between it and said output shaft, upon disengagement of at least one of said drive and coast locks from said shift member, between (a) a low-gear position in which it engages said low-ratio gear (b), a neutral position in which it is disengaged from said high-ratio and low-ratio gears, and (c) a high-gear position in which it engages said high-ratio gear.

2. A transmission according to claim 1 further comprising (a) motive means for disengaging one of said locks from said shift member when said shift member is in one of said low-gear and high-gear positions, thereby permitting said shift member to become disengaged from the other of said locks, and positioning said one lock to permit said shift member to move to the other of said low-gear and high-gear positions and (b) biasing means responsive to such movement of said shift member for moving said other lock to re-establish engagement between said shift member and said other lock at said other position.

3. A transmission according to claim 1 further comprising a pair of pawl assemblies mounted on said shaft member, one of said pawl assemblies being opposable to said high-ratio gear and the other of said pawl assemblies being simultaneously opposable to said low-ratio gear when said shift member is in said neutral position, said pawl assemblies being oppositely oriented to permit overrunning of said shift member by said high-ratio gear in one direction only and overrunning of said shift member by said low-ratio gear in the other direction only so that, when said shift member is in said neutral position, the rotational speed of said shift member cannot be greater than the rotational speed of said high-ratio gear nor less than the rotational speed of said low-ratio gear.

4. A transmission according to claim 3 further comprising brake means for slowing said input shaft while said transmission is in neutral during an upshift to synchronize said high-speed gear with the pawl assembly opposed thereto.

5. A transmission according to claim 4 in which said brake means is power actuated in response to shift movement of a part of said transmission.

6. A self-shifting transmission comprising a shift member, first and second locks, each lock being positionable in one of first and second positions, said locks when both are in said first position maintaining said shift member in a low-gear position, when both are in said second position maintaining said shift member in a high-gear position, and when one is in said first position and the other is in said second position permitting said shift member to move between said low bear and high gear position; and motive means for selectively moving said locks to a condition in which one is in said first position and the other is in said second position to facilitate a ratio change.

References Cited

UNITED STATES PATENTS

| | | | |
|---|---|---|---|
| 2,515,114 | 7/1950 | Chilton | 74—337 X |
| 2,527,658 | 10/1950 | Sinclair | 74—337 X |
| 2,599,216 | 6/1952 | Wuetig | 74—337 X |

LEONARD H. GERIN, Primary Examiner

U.S. Cl. X.R.

74—337, 339, 877; 192—.044, .055, .073

PO-1050
(5/69)

UNITED STATES PATENT OFFICE
CERTIFICATE OF CORRECTION

Patent No. 3,511,116  Dated May 12, 1970

Inventor(s) Irvin G. Detra

It is certified that error appears in the above-identified patent and that said Letters Patent are hereby corrected as shown below:

Col. 5, line 23, "DK" should read --DX--;

Col. 11, line 38, "shaft" should read --shift--; and

Col. 12, line 26, "low bear" should read --low gear--.

SIGNED AND
SEALED
AUG 25 1970

(SEAL)
Attest:

Edward M. Fletcher, Jr.
Attesting Officer

WILLIAM E. SCHUYLER, JR.
Commissioner of Patents